March 11, 1958  R. M. PACE  2,826,307
FLUID RECIRCULATION SYSTEMS
Filed Aug. 22, 1955  2 Sheets-Sheet 1

ROBERT M. PACE
INVENTOR
HUEBNER, BEEHLER,
WORREL & HERZIG
ATTORNEYS
BY Richard M. Worrel

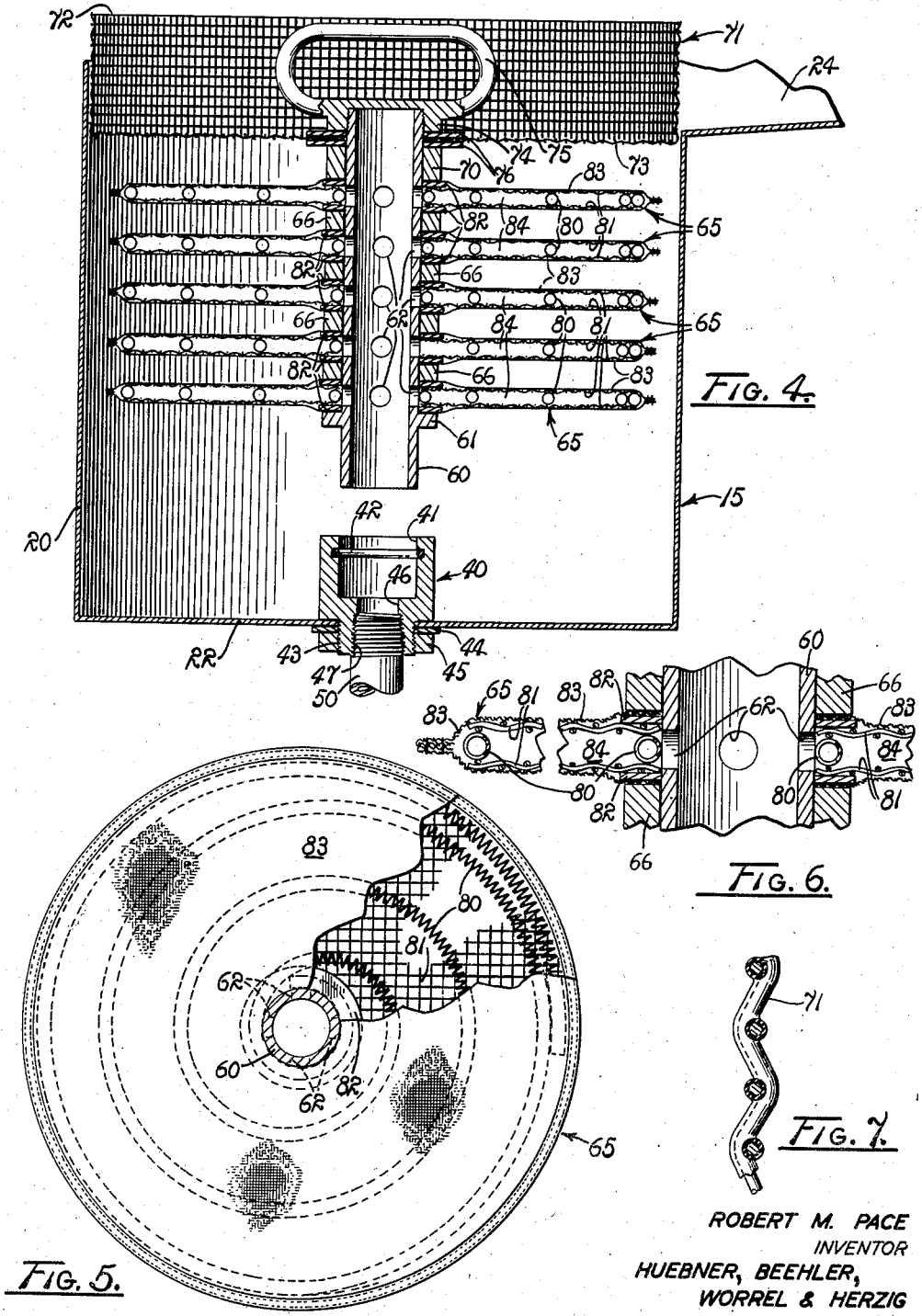

United States Patent Office 2,826,307
Patented Mar. 11, 1958

2,826,307

FLUID RECIRCULATION SYSTEMS

Robert M. Pace, Berkeley, Calif.,

Application August 22, 1955, Serial No. 529,807

4 Claims. (Cl. 210—169)

The present invention relates to fluid recirculation systems and more particularly to such a system having a filter which can be cleansed without backwashing in a simple, expeditious and effective manner.

It will be apparent that the filter of the present invention is suitable for use in environments generally where filters are desired but since it was developed in connection with the solution to certain filtration problems particularly significant to swimming pools, the illustrative embodiment of the invention shown in the drawings is described in connection with such use.

Because of the vast quantities of water required for swimming pools, it is the general practice, at least in private pools, to filter and to chemically treat the water in order to maintain desired purity rather than periodically to drain and to refill the pools. By such means, draining and refilling can be avoided for several years. In spite of such long periods of use, the water can be kept at a purity level superior to that of many municipal and domestic water systems.

While the filters employed with swimming pools have been highly effective in performing their intended functions, they have been subject to certain disadvantages which motivated the present invention. After conventional filters have been employed for a period of time, their filter beds become so impregnated with foreign materials filtered from the water that the forcing of the water through the filters becomes extremely difficult. Under such conditions the flow rate is decreased to such an extent that the filters must be cleaned by backwashing, a procedure which simply involves the reversing of the flow of water through the filter beds. It is of course essential that the return of the foreign materials to the swimming pools be avoided. Thus provision is required for a separate discharge from the filter and a valve control system whereby the flow of water through the filter can be reversed and directed through the separate discharge to waste. Not only are conventional filters expensive but the requisite valving systems, pipes and fittings likewise costly. In backwashing the filters of domestic pools, the full flow of the pumping facilities is directed through the filters and to waste for a period of approximately five minutes. This results in the discharge of substantial quantities of water. This is onerous not only from the standpoint of the water loss but also poses a serious disposal problem. In urban areas the disposal of the backwash water is of such serious difficulty that the backwashing is performed much less frequently than preferred.

After extensive periods of use of conventional filters, particularly where the backwashing has been minimized, the filter beds become channeled and backwashing is ineffective in accomplishing a thorough cleansing. In such instances, the filters must be opened, the interiors emptied, and new filter beds provided.

There are also certain additional disadvantages to conventional swimming pool filter systems of significant contrast to the results attained by the present invention. The facilities required for backwashing and discharge to waste make it impossible for conventional filters to make provision for recirculating overflow and skimming of the pools. Thus it is the conventional practice to provide skimmers separate and apart from the filters. The backwashing frequently washes dirt and debris into the underside of the filter bed which is subsequently washed back into the pool when the filter is returned to normal operation. Water is forced through conventional swimming pool filters under pressure, a condition which normally makes filtering less effective than under gravity flow and serves unduly to pack filter beds.

In view of the foregoing, an object of the present invention is to provide an improved filter which can be cleansed without backwashing in a simple expeditious and effective manner.

Another object is to provide a filter through which filterable fluid is drawn in gravity flow.

Another object is to provide a filter which can be cleaned by removal and rinsing of filtering and screening elements therefrom.

Another object is to provide a combined circulating overflow, skimmer, and filter for swimming pools and the like.

Another object is to avoid the problems incident to water disposal resulting from filter backwash operations.

Another object is to provide a filter which is much more economical and durable than conventional filters for similar purposes.

Other objects and advantages will become apparent in the subsequent description in the specification.

In the drawings:

Fig. 4 is a diametric vertical section of the filter of the present invention.

Fig. 5 is a plan view of a filter plate, a plurality of which are employed in the filter, having portions thereof removed to reveal internal structure.

Fig. 6 is a fragmentary diametric vertical section of a filter plate and associated mounting structure therefor.

Fig. 7 is an enlarged fragmentary section of a screen basket employed in the filter.

Figure 1:
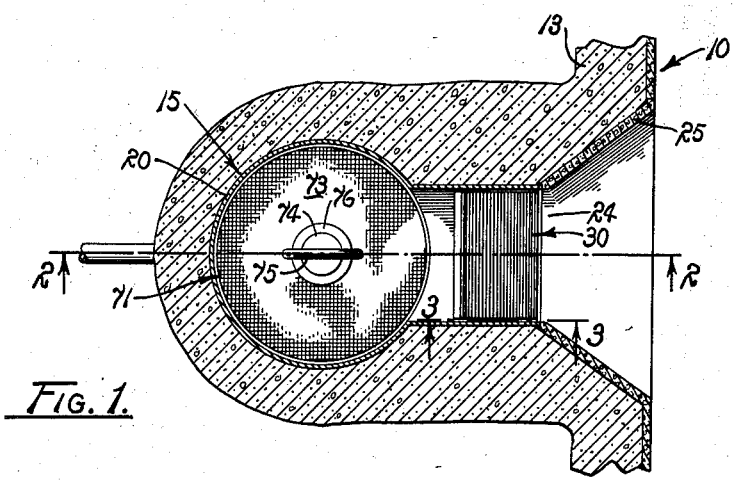
Fig. 1 is a horizontal section through a marginal portion of a swimming pool having a filter of the present invention mounted therein.

Referring in greater detail to the drawings:

A swimming pool is indicated generally at 10 containing a pool of water 11 having a predetermined approximate normal water level 12. The pool has side walls 13 of concrete or the like and a marginal walk 14. A filter 15, embodying the principles of the present invention, is built into the marginal walk 14.

The filter 15 employs a substantially cylindrical, axially erect filter tank or housing 20 having an upper end 21 above the normal water level 12 and a closed lower end 22 therebelow. The upper end of the filter is open and releasably closed by a removable lid 23. A substantially horizontal passageway 24 extends from the upper end of the filter housing 20 to the swimming pool 10 at the approximate normal water level. The passageway 24 serves the function of a recirculating overflow and skimmer and is preferably lined with tile 25 for decorative purposes and to minimize the adherence of algae thereto.

The housing 20 may be of any suitable metal, cementitious, ceramic or other desired material and preferably has an inlet neck 29 extended into the passageway 24 and providing an upwardly turned lip 31 at the lower side thereof intermediate the housing and the pool. A weir 30 of buoyant material is transversely fitted to the passageway 24, pivotally mounted on the lip 31 and upwardly extended therefrom toward the filter. The weir is mounted on the lip by means of a flexible flange 32 integral therewith screwed or bolted to the lip, as at 33. The applicant finds styrene excellently suited to the formation of the weir inasmuch as it is water resistant, durable, and readily suited to the provision of a foam-like structure, as shown at 34, which is highly buoyant.

A socket member 40 is mounted concentrically in the lower end 22 of the housing 20 and provides an upwardly directed bore 41 in which an O-ring 42 or other suitable seal is provided. The socket member has a male screw-threaded portion 43 extended downwardly through the lower end of the housing which mounts a washer 44 thereon below the housing and is secured in water-tight assembly in the housing by means of a nut 45 screw-threaded onto the portion 43 upwardly against the washer. The socket member provides a bore 46 extended coaxially through the threaded portion 43 which in turn provides female screw threads 47.

A pipe 50 is screw-threaded into the bore 46 and leads to a pressure gage 51 connected to the intake side of a pump 52. The pump has a discharge pipe 53 which is returned to the pool at any position, not shown, at which it is desired to reintroduce filtered water.

Figure 2:
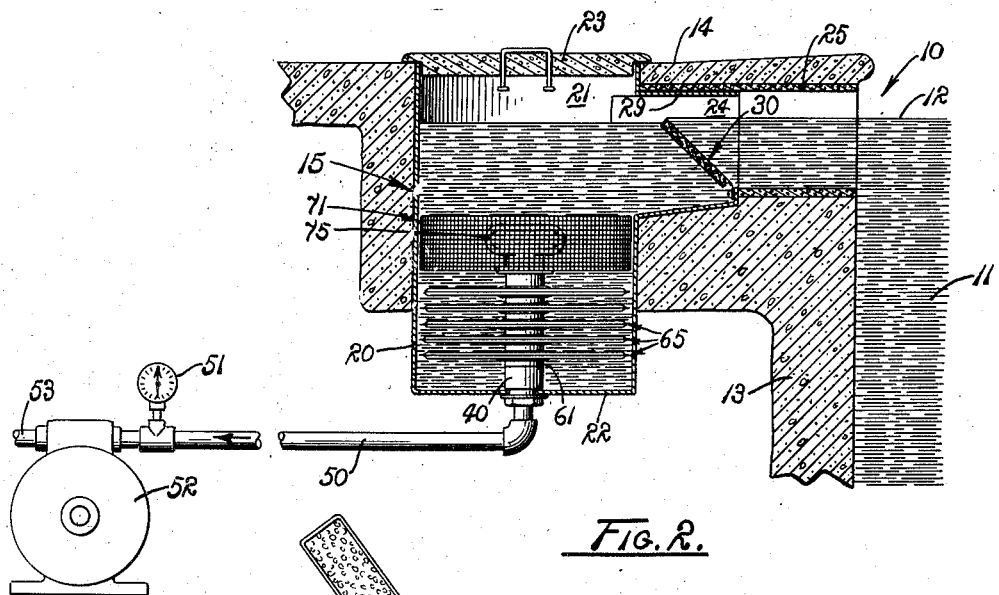
Fig. 2 is a vertical section, taken on line 2—2 of Fig. 1 of the marginal portion of the swimming pool shown in Fig. 1 and the filter mounted therein illustrated with certain associated structure, interior elements of the filter being shown in elevation.
Figure 3:
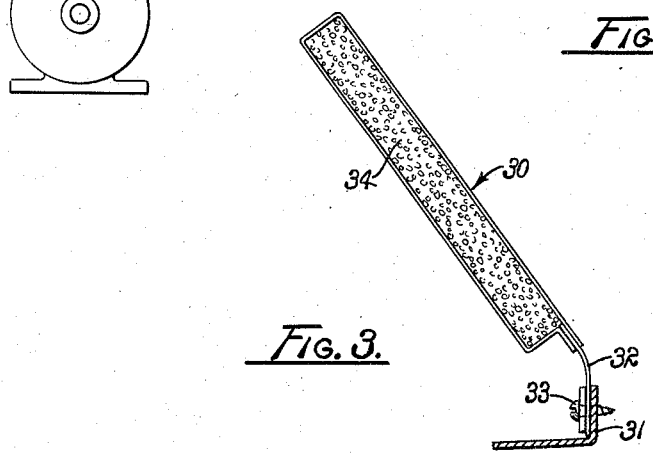
Fig. 3 is a section taken on line 3—3 of Fig. 1.

Referring to Figs. 2 and 4, a tubular core 60 is slidably fitted into the socket member 40 and is disposed coaxially of the housing 20. The core has a circumscribing flange 61 adapted to rest downwardly against the socket member when the core is mounted therein. A plurality of inlet openings 62 are provided in the core in elevationally spaced sets, with the openings in each set located in a common plane normal to the core. A plurality of substantially disk-like circular hollow filter elements or plates 65 are mounted concentrically on the core in superposed or stacked spaced relation. Annular spacers 66 are provided between the plates of such thickness that each plate overlays a set of the openings 62 with the hollow interiors of the plates in registry with the respective openings covered by their plates.

A sleeve 70 is slidably mounted on the core above the uppermost filter plate 65. A substantially cylindrical screen basket 71 having an open top 72 and a closed bottom 73 is mounted concentrically on the core in rested relation on the upper end of the sleeve. The upper end of the core is screw-threaded and a head casting 74 having a handle portion 75 is screw-threadably mounted thereon and tightened downwardly against the bottom of the screen basket dependably to clamp the same and the stacked filter plates 65, annular spacers 66 and sleeve 70 in unitary, assembled relation.

As shown in Figs. 4 and 7, the screen basket 71 is conveniently formed of hardware cloth or other suitable screen material which is in turn preferably coated with neoprene or other suitable water resistant protective material. It will likewise be apparent that the other elements of the filter described which are immersed in water should also be of a material, or coated with a material, which is water resistant and also resistant to chlorine and other chemicals normally employed for sanitation and algae killing purposes. Washers 76 reinforce the bottom 73 of the screen 71 where clamped between the casting 74 and the sleeve 70.

Referring to Figs. 4, 5 and 6, the preferred structure of the filter plates will be clearly evident. Each filter plate consists of a helical wire spacer, of stainless steel or the like, coiled in a helical arrangement to provide a substantially circular periphery and a substantially circular inner opening. The convolutions of the spacer are preferably in a common plane. A circular screen 81 of hardware cloth or the like is mounted above and below the spacer 80 with said spacer sandwiched therebetween.

The screens may be soldered or otherwise secured to the spacer, if desired. A pair of washers 82 are slidably fitted to the core 60 and have the screens 81 and spacer 80 clamped therebetween. The washers 82 are conveniently formed of brass and also may be soldered or otherwise secured to the screens 81 and spacer 80. A circular fabric envelope 83 encloses the washers, screens, and spacer. It will be apparent that the described structure provides a hollow interior 84 which registers with the inlet openings 62. Since the filter plates are substantially identical, only one thereof is described. It will be evident, that various types of spacers, screens, and envelopes may be utilized. As evident in Fig. 4, the peripheries of the filter plates are in adjacent spaced relation to the walls of the housing and the screen baskets 71 slidably fitted thereto.

Operation

The operation and utility of the filter of the present invention are believed to be clearly apparent and are briefly summarized at this point. Upon actuation of the pump 52, it draws water from the housing 20 so that a gravitational flow of water through the passageway 24 into the housing occurs. The inward movement of the water causes the weir 30 to assume the position shown in Fig. 2. Debris floating on the water is thus permitted to pass into the filter and the skimming function is thus accomplished. The buoyancy of the weir and its floating attitude precludes return of such debris to the pool incident to splashing, de-actuation of the pump 52, or the like.

As the water flows through the passageway 24 into the filter it descends through the screen basket 71 in which all larger portions of the debris are collected for subsequent removal.

To attain optimum results from the filter, a filter clay such as diatomaceous earth, is placed in the water preferably in the passageway 24, top of the housing 20 or basket 71. Such clay is of extremely fine particle size and is not shown in the drawings. As the pump withdraws water from the housing, the water passes inwardly through the envelopes 83 of the filter plates into the hollow interiors 84 thereof, through the inlet openings 62, downwardly through the core 60, and through the socket member 40 into the pipe 50. This movement of the water causes the filter clays to collect on the top and bottom surfaces of the filter plates effectively to hold even minute impurities carried by the water.

After extensive operation, the filter of the present invention of course requires cleaning. By observation of the gage 51, the time for cleaning can readily be determined. Excessive drop in pressure indicated by the gage results from filter clogging. The cleaning is effected in a simple and expeditious manner. The cover 23 is removed from the top of the housing 20 and the core 60, filter plates 65 and basket 71 withdrawn from the housing by grasping the handle 75. The assembled core, plates, and basket are conveniently rinsed with a garden hose or the like and the debris emptied from the basket. This operation requires only a minimum of rinsing water and can be completed in even less time and with less effort than usually required to clean conventional skimmers. After rinsing, the core and associated elements are returned to the housing with the lower end of the core nested in the socket member 40. Filter clay is again employed and the operation continued.

Although the filter plates 65 last indefinitely, they can readily be replaced, as can the basket 71, when worn or damaged. This is accomplished by unscrewing the casting 74 from the upper end of the core and sliding the basket 71, sleeve 70, plates 65, and spacer 66 therefrom. The desired new or repaired elements are returned to position on the core and the casting again tightened into place.

In actual operation, the filter of the present invention has been found to be highly effective. It efficiently combines the function of a recirculating overflow, skimmer, and filter. It can be simply and easily cleaned without the necessity of vast quantities of water for backwashing purposes. The cleaning can be accomplished with no more work than that normally involved in cleaning a skimmer and the filter can be returned to operation without the normal delay required for backwashing. The problems of disposing of backwash water have been obviated. When the filter has been cleaned, there is no debris collected against the bottom of the filter, as results from backwashing, which is returned to the pool. Its operation, maintenance and repair are economical and its initial cost approximately only twenty-five percent of that of conventional filters of similar capacity.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A filter structure for use in connection with a pool; comprising a substantially cylindrical filter housing open at its top and closed at its bottom to be mounted in an axially erect position adjacent to the pool with its upper end extended above the normal water level in said pool and its lower end disposed below said level, a fluid outlet concentrically disposed in said housing bottom, means for pumping water from the outlet back into the pool, means defining a substantially horizontal water passage between the pool and the housing at said water level, a buoyant weir pivotally mounted at the bottom of the water passage and upwardly extended therefrom toward the housing to admit floating debris to the housing and to preclude its return to the pool, a socket member mounted concentrically in the lower end of the housing in communication with the outlet, a tubular core releasably fitted to the socket member and upwardly extended therefrom concentrically of the housing, a plurality of filter plates mounted concentrically on the core in axially spaced relation therealong, each of the filter plates having hollow interiors and fluid pervious covers, the core having fluid inlets in communication with the interiors of the plates, a substantially cylindrical screen basket having a reticulated bottom and an open top mounted concentrically on the core above the filter plates in nested relation in the housing below the normal water level, and a handle mounted on the upper end of the core in integral association with the core, filter plates and basket accessible through the upper end of the housing.

2. A filter structure for use in connection with a pool; comprising a substantially cylindrical filter housing open at its top and closed at its bottom to be mounted in an axially erect position adjacent to the pool with its upper end extended above the normal water level in said pool and its lower end disposed below said level, a fluid outlet concentrically disposed in said bottom, means integral with said housing defining a substantially horizontal water passage between the pool and the housing at said water level, a buoyant weir pivotally mounted at the bottom of the water passage and upwardly extending therefrom toward the housing to admit floating debris to the housing and to preclude its return to the pool, a socket member mounted concentrically in the lower end of the housing in communication with the outlet, a tubular core releasably fitted to the socket member and upwardly extended therefrom concentrically of the housing, a plurality of disk-like filter elements mounted concentrically on the core in axially superposed relation therealong, each of the filter elements having spaced apart fluid pervious covers to provide a hollow interior, the core having fluid inlets in communication with the interiors of said filter elements, a substantially cylindrical screen basket having a reticulated bottom and an open top mounted within said cylindrical housing between the liquid level therein and the uppermost of said filter elements, and a handle mounted on the upper end of the core in integral association with the core and filter elements accessible through the upper end of the housing.

3. In a filter structure, a filter housing comprising an elongated cylinder of uniform diameter throughout its length closed at its bottom and open at its top, an inlet neck integral with and projecting laterally from said housing near the upper end thereof, a buoyant weir disposed transversely within said neck and pivoted at its lower end therein, an outlet socket concentrically mounted in said housing bottom, a tubular core of a diameter to interfit in said socket, said core having elevationally spaced sets of openings in its sides, a plurality of substantially hollow filter elements mounted concentrically on said core in stacked relation and each having its interior communicating with a set of said core openings, a basket supported by the upper end of said core, said filter elements and said basket being of diameters less than the transverse dimension of said housing, and said basket and said filter elements disposed below said inlet neck.

4. In a filter structure, a filter housing comprising an elongated cylinder of uniform diameter throughout its length closed at its bottom and open at its top, an inlet neck integral with and projecting laterally from said housing near the upper end thereof, a buoyant weir disposed transversely within said neck and pivoted at its lower end therein, an outlet socket concentrically mounted in said housing bottom, a tubular core of a diameter to interfit in said socket, said core having a plurality of openings in its sides, a plurality of liquid pervious substantially hollow filter elements mounted concentrically on said core in stacked spaced relation and each having its interior communicating with said core openings, a screen basket supported within said housing above the uppermost of said filter elements, said filter elements and said basket being of diameters less than the transverse dimension of said housing, and said basket and said filter elements disposed below said inlet neck.

References Cited in the file of this patent

UNITED STATES PATENTS

| | | |
|---|---|---|
| 543,389 | Loew | July 23, 1895 |
| 779,859 | Lukens | Jan. 10, 1905 |
| 1,169,418 | Morris | Jan. 25, 1916 |
| 1,335,087 | Bell | Mar. 30, 1920 |
| 2,701,235 | King | Feb. 1, 1955 |
| 2,792,943 | Mackintosh | May 21, 1957 |